United States Patent
Okayasu et al.

(10) Patent No.: US 8,078,734 B2
(45) Date of Patent: Dec. 13, 2011

(54) INFORMATION PROCESSING APPARATUS

(75) Inventors: Jiro Okayasu, Kanagawa-Ken (JP); Yasuhiko Abe, Saitama-Ken (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 968 days.

(21) Appl. No.: 12/070,469

(22) Filed: Feb. 19, 2008

(65) Prior Publication Data

US 2008/0233997 A1    Sep. 25, 2008

(30) Foreign Application Priority Data

Mar. 22, 2007  (JP) ............................. P2007-075464

(51) Int. Cl.
*G06F 15/16* (2006.01)
(52) U.S. Cl. .................... 709/227; 709/203; 709/228
(58) Field of Classification Search .................. 370/235, 370/310, 328, 329, 335, 338, 349, 352, 431, 370/465, 469; 709/227, 228, 230, 231, 203; 455/432.1, 434, 435.1, 450, 452.1, 452.2, 455/453, 454, 464, 466, 509, 510, 512, 515, 455/516, 552.1, 574
See application file for complete search history.

(56) References Cited

U.S. PATENT DOCUMENTS

| | | | | |
|---|---|---|---|---|
| 6,781,979 B1 * | 8/2004 | Ebata et al. | .................... | 370/338 |
| 7,028,073 B1 * | 4/2006 | Bui et al. | ...................... | 709/203 |
| 7,158,516 B2 * | 1/2007 | Lee et al. | ....................... | 370/392 |
| 2003/0208601 A1 * | 11/2003 | Campbell et al. | ............. | 709/227 |
| 2004/0059821 A1 * | 3/2004 | Tang et al. | ..................... | 709/228 |
| 2006/0133409 A1 * | 6/2006 | Prakash et al. | ................. | 370/450 |
| 2007/0010231 A1 * | 1/2007 | Du | ................................ | 455/405 |
| 2007/0178874 A1 * | 8/2007 | Matsuyama | ............... | 455/343.1 |

FOREIGN PATENT DOCUMENTS

| | | |
|---|---|---|
| JP | 10-327258 A | 12/1998 |
| JP | 11-252656 A | 9/1999 |
| JP | 2002-44099 A | 2/2002 |
| JP | 2006-050123 A | 2/2006 |
| WO | WO 2007/006053 A2 | 1/2007 |
| WO | WO 2007/012024 A1 | 1/2007 |

OTHER PUBLICATIONS

Japanese Office Action dated Jul. 21, 2009 (5 pages), issued in counterpart Japanese Application Serial No. 2007-075464.
Japanese Office Action dated Apr. 7, 2009 (2 pages), issued in counterpart Japanese Application No. 2007-075464.

* cited by examiner

*Primary Examiner* — Anthony Addy
(74) *Attorney, Agent, or Firm* — Maschoff Gilmore & Israelsen

(57) ABSTRACT

The present invention is capable of preferably performing the establishment of a session using a predetermined protocol. In a mobile phone device applicable to an information processing apparatus according to an embodiment of the present invention, the CPU of a main control unit executes NAI middleware, performs connection using a predetermined protocol via a system layer, acquires a connection request or a disconnection request from an individual application program, and controls, on the basis of the acquired connection request or disconnection request, the connection using the predetermined protocol performed by a connection unit.

9 Claims, 9 Drawing Sheets

INFORMATION PROCESSING APPARATUS

BACKGROUND OF THE INVENTION

1. Field of the Invention

The present invention relates to an information processing apparatus, particularly to an information processing apparatus capable of performing connection using a PPP.

2. Description of the Related Art

In recent years, mobile phone devices functioning as an information processing apparatus have been increasingly provided with a variety of functions, such as an address book function, a mail function using a base station or a network such as the Internet, and a browser function enabling the browsing of a Web page, in addition to a simple communication function based on an audio call.

In particular, to perform data communication via the base station by using the mail function or the browser function, connection using a PPP (Point to Point Protocol) is first performed. Then, a PPP session is established by the connection using the PPP. Thereafter, the data communication is performed between desired two points.

As a technique relating to such a connection using the PPP, there has been proposed a technology of reestablishing a PPP session in a CDMA network system, for example, in a simple sequence (see Japanese Unexamined Patent Application Publication No. 2006-50123, for example).

In the conventional technology, however, the connection using the PPP is individually managed for each application program having the mail function or the browser function, and the like. Therefore, if the start of the mail function or the browser function is instructed by a user, the connection using the PPP is performed for respective application programs, and the PPP session is established by the connection using the PPP.

As a result, there arises a situation in which the connection using the PPP and the disconnection of the connection frequently occur and thus the establishment of the PPP session takes a long time in spite of the use of the same PPP session. Such a situation cannot be handled by the technology proposed in the above publication.

SUMMARY OF THE INVENTION

The present invention has been made in view of the above circumstance, and an object of the present invention is to provide an information processing apparatus capable of favorably performing the establishment of a session with use of a predetermined protocol.

To achieve the above object, an information processing apparatus according to an aspect of the present invention includes a connection unit configured to perform connection with use of a predetermined protocol, an acquisition unit configured to acquire a connection request or a disconnection request from respective application programs, and a control unit configured to control the connection with use of the predetermined protocol performed by the connection unit, on the basis of the connection request or the disconnection request acquired by the acquisition unit.

In the information processing apparatus according to the above aspect of the present invention, the connection is performed with the use of the predetermined protocol, and the connection request or the disconnection request is acquired from the respective application programs. Then, on the basis of the acquired connection request or disconnection request, the connection using the predetermined protocol performed by the connection unit is controlled.

According to the present invention, the establishment of a session using a predetermined protocol can be preferably performed.

DESCRIPTION OF THE PREFERRED EMBODIMENT

Figure 1A:
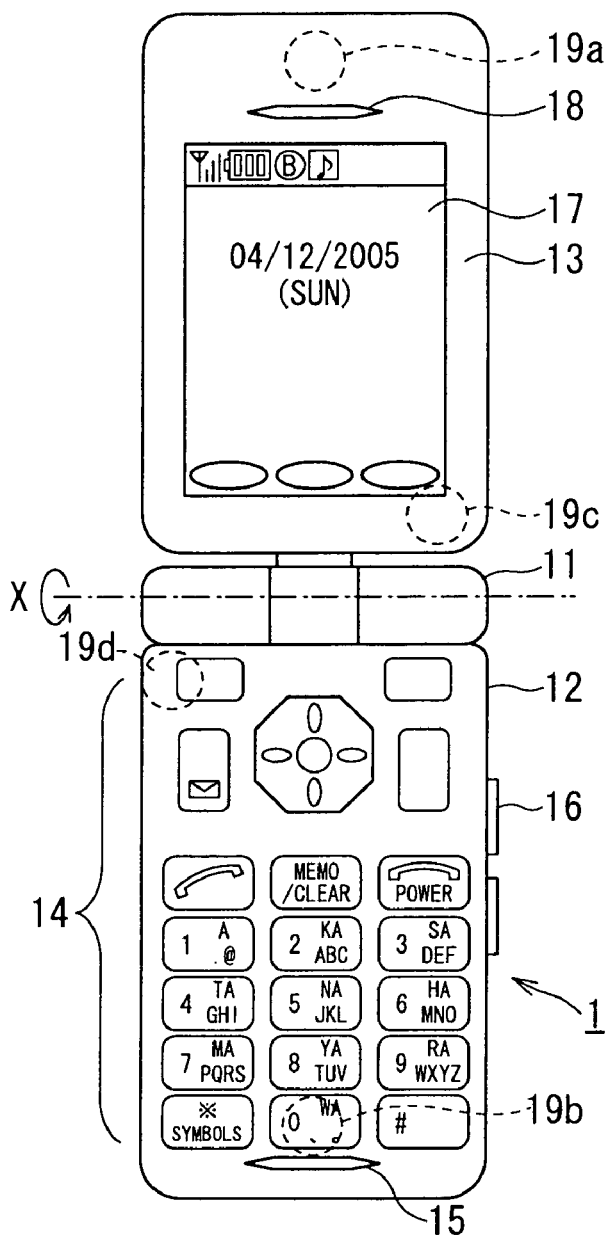
FIGS. 1A and 1B are external views illustrating a configuration of the exterior of a mobile phone device applicable to an information processing apparatus according to an embodiment of the present invention.
Figure 1B:
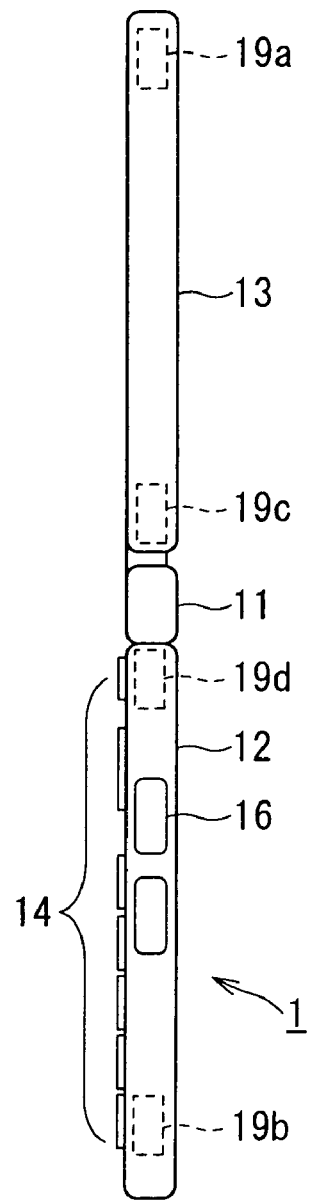

With reference to the drawings, an embodiment of the present invention will be described. FIGS. 1A and 1B illustrate a configuration of the exterior of a mobile phone device 1 applicable as an information processing apparatus according to an embodiment of the present invention. FIG. 1A illustrates the configuration of the exterior of the mobile phone device 1 opened to approximately 180 degrees, as viewed from the front side. FIG. 1B illustrates the configuration of the exterior of the opened mobile phone device 1, as viewed from a lateral side.

As illustrated in FIGS. 1A and 1B, in the mobile phone device 1, a first casing 12 and a second casing 13 are hinge-connected across a hinge portion 11 placed in the center of the device. Thus, the mobile phone device 1 is configured to be foldable via the hinge portion 11 in the direction of an arrow X. At a predetermined position inside the mobile phone device 1, a transmitting and receiving antenna (an antenna 44 of FIG. 3 later described) is provided. Through the built-in antenna, the mobile phone device 1 transmits and receives radio waves to and from a base station (not illustrated).

A surface of the first casing 12 is provided with operation keys 14, which include numeric keys representing numbers 0 to 9, a call key, a redial key, a call-end and power key, a clear key, a mail key, and so forth. With the use of the operation keys 14, a variety of instructions can be input.

As the operation keys 14, a cross key and a determination key are provided on an upper portion of the first casing 12. Through the operation of the cross key by a user in the vertical and horizontal directions, the user can move a focused cursor in the vertical and horizontal directions. Specifically, the user performs a variety of operations, such as a scrolling operation in a phone book list or a mail displayed on a liquid crystal display 17 provided on the second casing 13, a page turning operation of turning pages of a simplified Web site, and an image advancing operation.

Further, through the pressing of the determination key, a variety of functions can be determined. For example, in the first casing 12, a desired phone number is selected from a plurality of phone numbers included in the phone book list displayed on the liquid crystal display 17, in accordance with the operation of the cross key by the user. Then, as the determination key is pressed toward the inside of the first casing 12, the selected phone number is determined, and a call process for calling the phone number is performed.

Further, on the first casing 12, the mail key is provided on the left side of the cross key and the determination key. If the mail key is pressed toward the inside of first casing 12, a mail transmitting and receiving function can be called. On the right side of the cross key and the determination key, a browser key is provided. If the browser key is pressed toward the inside of first casing 12, data of a Web page can be browsed. The mail key and the browser key provided on the left side and the right side of the cross key and the determination key, respectively, can have a variety of functions, such as functions representing "YES" and "NO," for example, depending on the screen displayed on the liquid crystal display 17. Therefore, the mail key and the browser key are referred to as a soft1 key and a soft2 key, respectively.

The first casing 12 is further provided with a microphone 15 below the operation keys 14 so that the microphone 15 collects the sound of the user in a call. Further, the first casing 12 is provided with a side key 16 for performing an operation of the mobile phone device 1.

Further, the first casing 12 is provided with a battery pack (not illustrated) attached and inserted in the back surface thereof. When the call-end and power key is turned on, electric power is supplied from the battery pack to respective circuit units to bring the circuit units into an operational state.

Meanwhile, the second casing 13 is provided with the liquid crystal display 17 (a main display) on the front side thereof. The liquid crystal display 17 can display the radio wave reception state, the remaining battery charge, the name and the phone number of an addressee registered to constitute the phone book, the call history, and so forth. The liquid crystal display 17 can also display the content of a mail, a simplified Web site, an image photographed by a CCD (Charge Coupled Device) camera (a CCD camera 20 of FIG. 2 later described), a content received from an external content server (not illustrated), and a content stored in a memory card (a memory card 46 of FIG. 3 later described).

Further, at a predetermined position above the liquid crystal display 17, a speaker 18 is provided to enable the user to make an audio call.

Figure 2A:
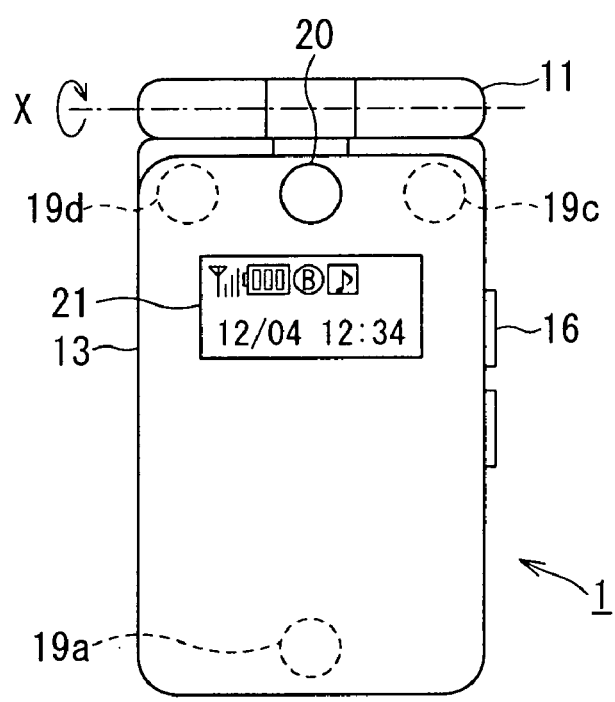
FIGS. 2A and 2B are other external views illustrating the configuration of the exterior of the mobile phone device applicable to the information processing apparatus according to the embodiment of the present invention.
Figure 2B:
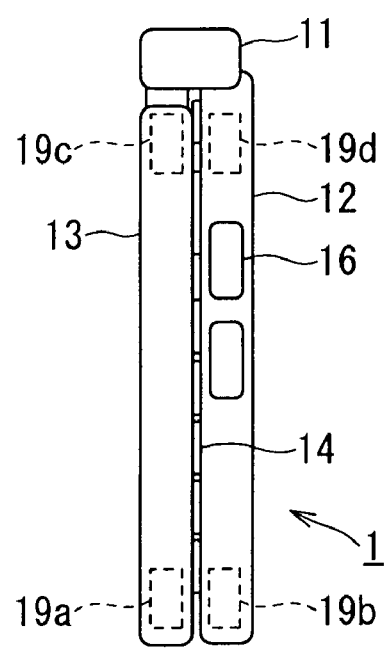

FIGS. 2A and 2B illustrate other external views of the configuration of the exterior of the mobile phone device 1 applicable as the information processing apparatus according to the embodiment of the present invention. The mobile phone device 1 of FIGS. 2A and 2B is rotationally moved in the direction of an arrow X from the state of the mobile phone device 1 of FIGS. 1A and 1B. FIG. 2A illustrates the configuration of the exterior of the closed mobile phone device 1, as viewed from the front side. FIG. 2B illustrates the configuration of the exterior of the closed mobile phone device 1, as viewed from a lateral side.

An upper portion of the second casing 13 is provided with the CCD camera 20 to enable a desired photographing target to be photographed. Below the CCD camera 20, a sub display 21 is provided to display an antenna pictograph indicating a current antenna sensitivity level, a battery pictograph indicating a current remaining battery charge of the mobile phone device 1, a current time, and so forth.

Figure 3:
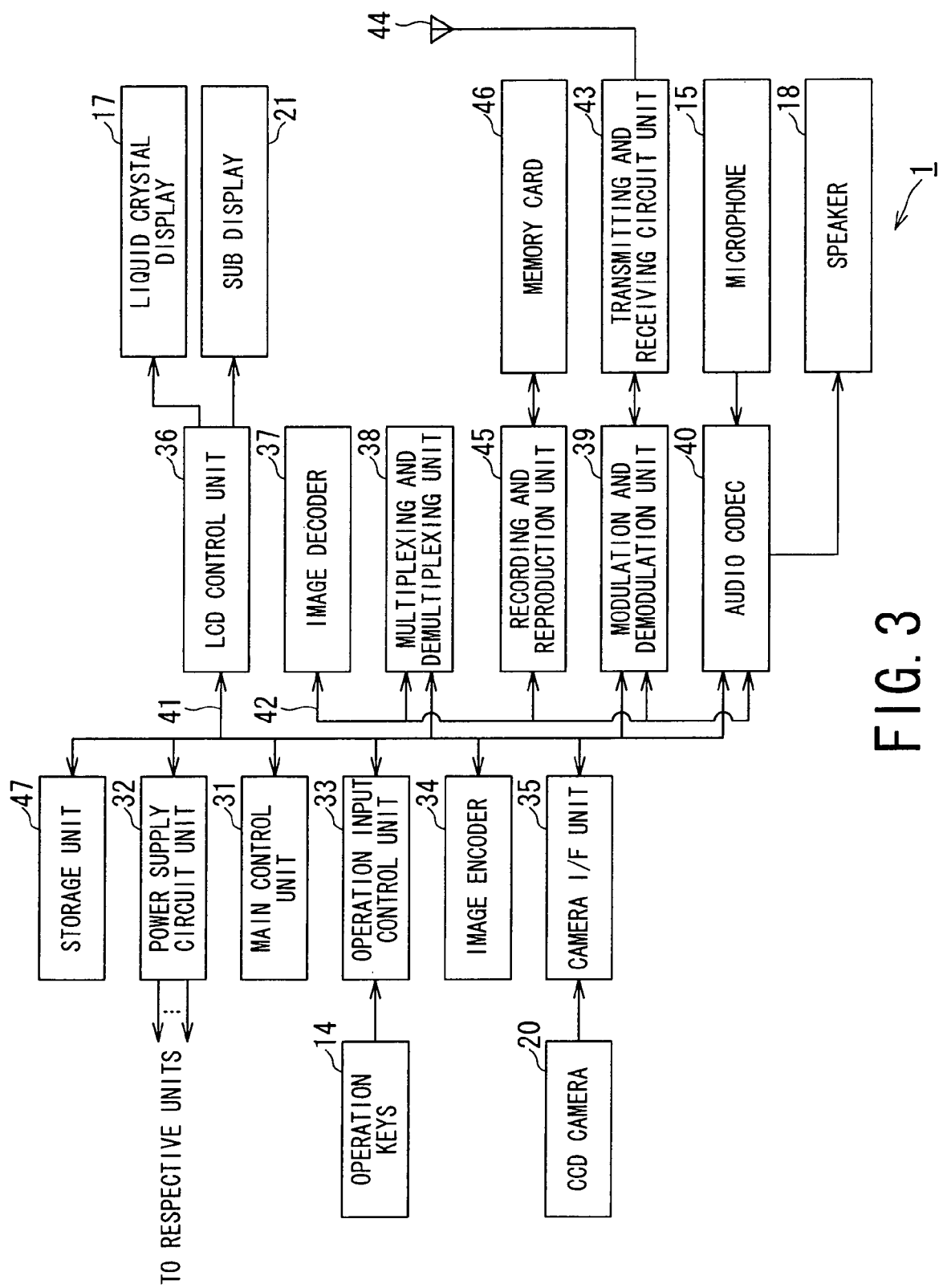
FIG. 3 is a block diagram illustrating an internal configuration of the mobile phone device applicable to the information processing apparatus according to the embodiment of the present invention.

FIG. 3 illustrates an internal configuration of the mobile phone device 1 applicable as the information processing apparatus according to the embodiment of the present invention. As illustrated in FIG. 3, in the configuration of the mobile phone device 1, a main control unit 31 for performing an overall control of respective parts of the first casing 12 and the second casing 13 is connected to a power supply circuit unit 32, an operation input control unit 33, an image encoder 34, a camera interface unit 35, an LCD (Liquid Crystal Display) control unit 36, a multiplexing and demultiplexing unit 38, a modulation and demodulation circuit unit 39, an audio codec 40, and a storage unit 47, which are connected to one another via a main bus 41. Further, an image decoder 37, the multiplexing and demultiplexing unit 38, the modulation and demodulation circuit unit 39, the audio codec 40, and a recording and reproduction unit 45 are connected to one another via a synchronous bus 42.

The main control unit 31 includes a CPU (Central Processing Unit), a ROM (Read Only Memory), a RAM (Random Access Memory), and so forth. The CPU performs a variety of processes in accordance with programs stored in the ROM or a variety of application programs loaded from the storage unit 47 into the RAM. Further, the CPU generates a variety of control signals, and supplies the control signals to the respective units to perform the overall control of the mobile phone device 1. The RAM stores, as needed, data necessary for the CPU to perform the variety of processes, for example. The main control unit 31 includes therein a timer for accurately measuring a current date and time.

In the mobile phone device 1, on the basis of the control by the main control unit 31, the audio codec 40 converts an audio signal of the sound collected by the microphone 15 in an audio call, for example, into a digital audio signal, and compresses the digital audio signal. Then, the modulation and demodulation circuit unit 39 performs a spread spectrum process on the signal, and a transmitting and receiving circuit unit 43 performs a digital-analog conversion process and a frequency conversion process on the signal. Thereafter, the signal is transmitted through the antenna 44.

Further, in the mobile phone device 1, a received signal received by the antenna 44 in the audio call is amplified and subjected to a frequency conversion process and an analog-digital conversion process. Then, the signal is subjected to a de-spread spectrum process by the modulation and demodulation circuit unit 39, and is expanded and converted into an analog audio signal by the audio codec 40. Thereafter, the converted analog audio signal is output through the speaker 18.

Furthermore, in the mobile phone device 1, to transmit a mail, for example, in data communication (e.g., the transmission and reception of a mail, the browsing during the operation of a browser function, and the download of a game application), text data of the mail input by the operation of the operation keys 14 is transmitted to the main control unit 31 via the operation input control unit 33. The main control unit 31 causes the text data to be subjected to the spread spectrum process in the modulation and demodulation circuit unit 39 and the digital-analog conversion process and the frequency conversion process in the transmitting and receiving circuit unit 43, and then to be transmitted to the base station (not illustrated) via the antenna 44.

Meanwhile, in the reception of a mail in the data communication, the mobile phone device 1 causes a received signal received from the base station (not illustrated) via the antenna 44 to be subjected to the de-spread spectrum process in the modulation and demodulation circuit unit 39 so that the original text data is restored. Thereafter, the data is displayed as a mail on the liquid crystal display 17 via the LCD control unit 36.

To transmit an image signal, for example, in the data communication using a television phone function, the mobile phone device 1 supplies the image signal of the image photographed by the CCD camera 20 to the image encoder 34 via the camera interface unit 35.

The image encoder 34 performs compression encoding on the image signal supplied by the CCD camera 20 in accordance with a predetermined encoding method, such as MPEG (Moving Picture Experts Group) 4, for example, to convert the image signal into an encoded image signal. Then, the image encoder 34 transmits the converted encoded image signal to the multiplexing and demultiplexing unit 38. At the same time, the mobile phone device 1 transmits the sound collected by the microphone 15 during the photographing by the CCD camera 20 to the multiplexing and demultiplexing unit 38 via the audio codec 40 in the form of a digital audio signal.

The multiplexing and demultiplexing unit 38 multiplexes, in a predetermined method, the encoded image signal supplied by the image encoder 34 and the audio signal supplied by the audio codec 40. A resultant multiplexed signal is subjected to the spread spectrum process in the modulation and demodulation circuit unit 39 and the digital-analog conversion process and the frequency conversion process in the transmitting and receiving circuit unit 43. Thereafter, the signal is transmitted via the antenna 44.

The mobile phone device 1 can also receive data of a Web page in the data communication using the browser function, for example. Further, when the mobile phone device 1 receives data of a moving image file linked to the Web page or the like, for example, in the data communication using the browser function, the modulation and demodulation circuit unit 39 performs the de-spread spectrum process on a received signal received from the base station (not illustrated) via the antenna 44. Then, a resultant multiplexed signal is transmitted to the multiplexing and demultiplexing unit 38.

The multiplexing and demultiplexing unit 38 divides the multiplexed signal into an encoded image signal and an audio signal, and supplies the encoded image signal and the audio signal to the image decoder 37 and the audio codec 40, respectively, via the synchronous bus 42. The image decoder 37 decodes the encoded image signal in a decoding method corresponding to the predetermined encoding method, such as MPEG 4, to generate a reproduced moving image signal. Then, the image decoder 37 supplies the generated reproduced moving image signal to the liquid crystal display 17 via the LCD control unit 36. Thereby, the moving image data included in the moving image file linked to the Web page or the like, for example, is displayed.

As the same time, the audio codec 40 converts the audio signal into an analog audio signal, and supplies the analog audio signal to the speaker 18. Thereby, the audio signal included in the moving image file linked to the Web page or the like, for example, is reproduced.

The storage unit 47 includes, for example, a HDD (Hard Disc Drive) and a flash memory device constituting a non-volatile memory capable of electrically rewriting and deleting data. The storage unit 47 stores a variety of data groups and a variety of application programs executed by the CPU of the main control unit 31.

Figure 4A:
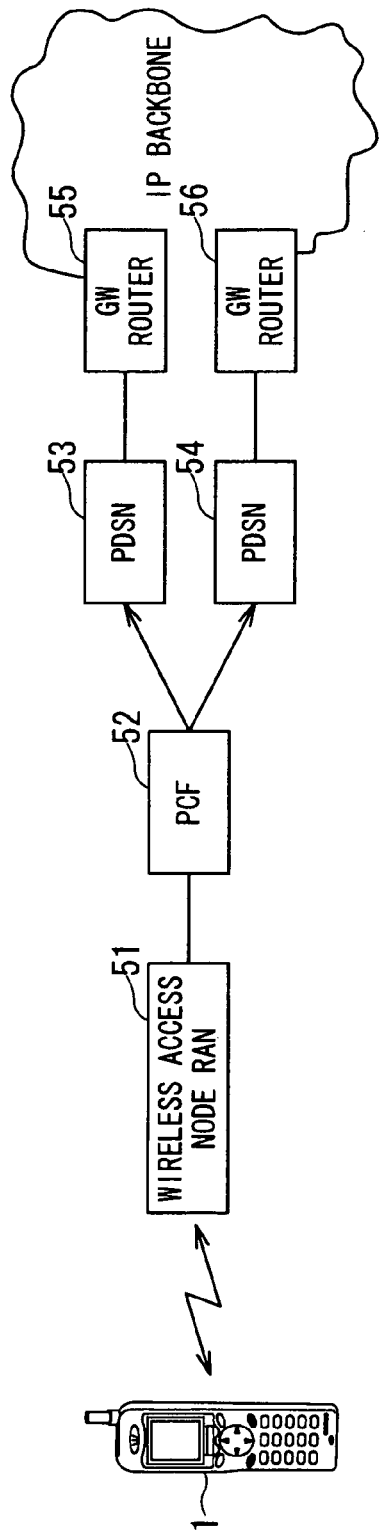
FIG. 4A is an explanatory diagram for explaining a schematic communication system employed in packet commutation using a packet communication network.

In packet communication using a packet communication network, the communication can be performed in a mechanism illustrated in FIG. 4A, for example. In FIG. 4A, when the mobile phone device 1 performs the packet communication (e.g., the packet communication in the mail function, the browser function, or the game function), the packet communication is performed through a wireless access node RAN (Radio Access Network) 51, a packet control node PCF (Packet Control Function) 52, packet gateway PDSNs (Packet Data Serving Nodes) 53 and 54, and gateway routers 55 and 56, for example. One end of the PCF 52 is connected to either one of the packet gateway PDSNs 53 and 54, and the other end of the PCF 52 is connected to the RAN 51. The RAN 51 can communicate with the mobile phone device 1 by wireless.

In the packet gateway PDSNs 53 and 54, the packet gateway can be changed depending on the function. For example, the same packet gateway PDSN 53 may be used as the packet gateway PDSN for the packet communication in the mail function and the browser function, while the packet gateway PDSN 54 different from the packet gateway PDSN used in the mail function and the browser function may be used as the packet gateway PDSN for the packet communication in the game function. Further, the packet gateway PDSNs 53 and 54 are connected to an IP backbone via the gateway routers 55 and 56, respectively. The establishment of a PPP session in the packet communication in the mail function, for example, refers to the establishment of the session between the mobile phone device 1 and the packet gateway PDSN 53, for example.

Figure 4B:
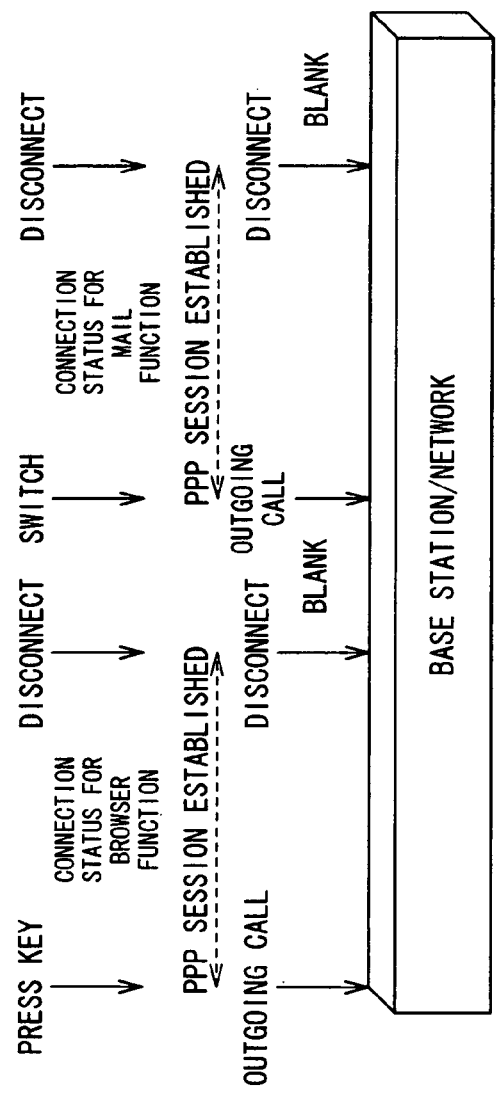
FIG. 4B is an explanatory diagram for explaining a method of establishing a PPP session for each application program.

In the packet communication performed in the packet communication network as illustrated in FIG. 4A, conventionally, connection using a PPP is individually managed for each of application programs, such as the mail function, the browser function, the game function, and a navigation function, for example. Therefore, as illustrated in FIG. 4B, for example, if an instruction for performing an operation for the packet communication in the mail function, the browser function, and the game function is received in accordance with the operation of the operation keys 14 by the user, the mobile phone device 1 performs the connection using the PPP for each of the application programs, and establishes the PPP session through the connection using the PPP. As a result, the connection using the PPP and the disconnection of the connection frequently occur, and thus the establishment of the PPP session takes a long time irrespective of the use of the same PPP session.

In the present configuration, therefore, the connection using the PPP is not managed for each of the application programs in the establishment of the PPP session. In the present configuration, a hierarchical structure normally formed by an application layer, a socket layer, and a PPP layer is replaced by two sections, i.e., middleware for network access (hereinafter described as the NAI) and the application programs. Further, the establishment of the session for each of the application programs is incorporated with base PPP connection established by the NAI. Furthermore, uses of the PPP by the respective application programs are unified in the base PPP connection, and the base PPP connection is controlled separately from the application programs. Accordingly, it is possible to preferably perform the establishment of a session using a predetermined protocol, and to reduce the time required for the reestablishment of the session.

Figure 5:
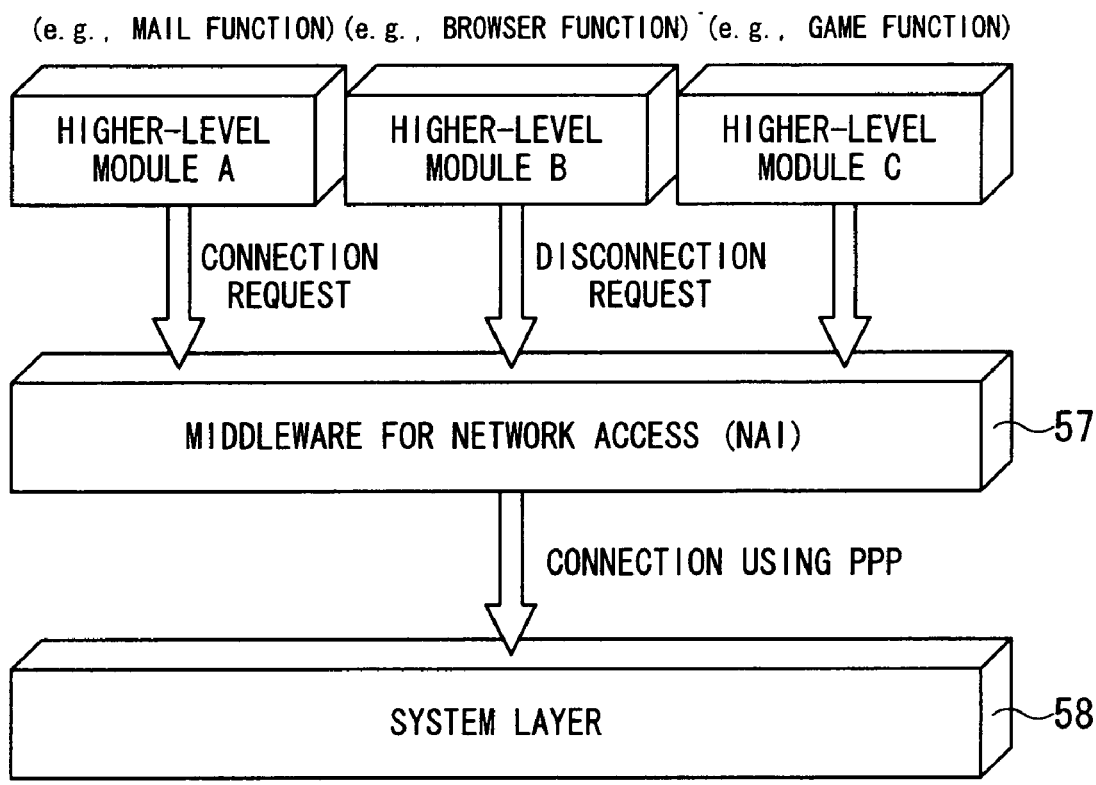
FIG. 5 is a diagram illustrating a conceptual configuration for managing, in an integrated manner, the establishment of a PPP session using NAI according to the embodiment of the present invention.

FIG. 5 illustrates a conceptual configuration for unifying, with the use of the middleware for network access (NAI) 57, the uses of the PPP by the respective application programs (software modules) in the base PPP connection.

As illustrated in FIG. 5, for example, the NAI 57 has a function of changing the network connection state (i.e., the state of the PPP session) of higher-level modules A to C and so forth in accordance with a connection request or a disconnection request received from the higher-level modules A to C and so forth. In the following description, the higher-level module A, the higher-level module B, and the higher-level module C are assumed to represent the mail function, the browser function, and the game function, respectively.

From the respective modules such as the higher-level modules A to C, the NAI 57 acquires (receives) the connection request for requesting the connection using the PPP or the disconnection request for requesting the disconnection of the connection. Then, on the basis of the connection request or the disconnection request acquired from the respective modules, the NAI 57 controls the connection using the PPP via a system layer 58 (e.g., the modulation and demodulation circuit unit 39 and the transmitting and receiving circuit unit 43 of FIG. 3 and a not-illustrated network). A connection control process using the above-described method will be described below.

With reference to a flowchart of FIG. 6, description will be made of the connection control process performed in the mobile phone device 1 of FIG. 3. As illustrated in FIG. 7, for example, in the connection control process described below, the operation keys 14 are operated by the user to first start an application program having the browser function (the higher-level module B), for example, and establish a PPP session. After the establishment of the PPP session, the reception and the display of specified information are performed. The displayed data displays information "abc@abc.com" of a so-called "mail to" function for starting the mail function. When the information "abc@abc.com" is selected by the user, the "mail to" function operates (the start of the mail function). Then, upon receipt of an instruction for transmitting a blank mail addressed to the address "abc@abc.com" (the transmission operation), for example, the application program having the browser function is temporarily stopped (or completed), and an application program having the mail function is started.

At Step S1, when an instruction for starting the browser function is received in accordance with the operation of the operation keys 14 by the user, the CPU of the main control unit 31 reads on the RAM the application program having the browser function stored in the ROM of the main control unit 31, and starts the application program having the browser function.

At Step S2, the CPU of the main control unit 31 executes the application program having the browser function, generates a connection request for requesting the connection using the PPP, and supplies the generated connection request to the NAI 57.

The connection request includes bearer information required for the establishment of the PPP session. The bearer information has been previously managed on predetermined software. For example, the bearer information includes information for accessing information relating to which one of the packet gateway PDSNs 53 and 54 is to be connected to the mobile phone device 1 (since the function used in this case is the browser function, the packet gateway PDSN to be connected to the mobile phone device 1 is the packet gateway PDSN 53).

At Step S3, the CPU of the main control unit 31 executes the NAI 57 to acquire the connection request from the application program having the browser function. At Step S4, the CPU of the main control unit 31 executes the NAI 57 to perform, on the basis of the acquired connection request, the connection using the PPP via the modulation and demodulation circuit unit 39 the transmitting and receiving circuit unit 43, which constitute the system layer 58. Thereby, the PPP session is established between the mobile phone device 1 and the packet gateway PDSN 53.

At Step S5, when the reception of specified information is completed after the start of the application program having the browser function and the establishment of the PPP session, the CPU of the main control unit 31 generates a disconnection request for requesting the disconnection of the connection using the PPP, and supplies the generated disconnection request to the NAI 57.

In the generation of the disconnection request, the application program having the browser function determines whether or not to hold the already established PPP session, and whether or not to add to the disconnection request a hold attribute which indicates that the already established PPP session should not be disconnected but should be held. If it is determined that the already established PPP session should not to be disconnected but should be held, the disconnection request is added with the hold attribute which indicates that the already established PPP session should not be disconnected but should be held. Meanwhile, if it is determined that the already established PPP session should not to be held but should be disconnected, the disconnection request is not added with the hold attribute which indicates that the already established PPP session should not be disconnected but should be held.

At Step S6, the CPU of the main control unit 31 executes the NAI 57 to acquire the disconnection request from the application program having the browser function (e.g., the higher-level module B), for example. At Step S7, the CPU of the main control unit 31 executes the NAI 57 to determine, on the basis of the acquired disconnection request, whether or not to hold the already held PPP session without disconnecting the session.

At Steps S5 to S7, each of the higher-level modules determines whether or not to hold the already established session, and adds the hold attribute to the disconnection request so that the NAI 57 makes the determination at Step S7 on the basis of the hold attribute. However, the determination process is not limited to the above. Thus, information of whether or not to hold the already established session may be added to the disconnection request so that the NAI 57 determines at Step S7 whether or not to hold the already established session. Alternatively, instead of the configuration in which each of the higher-level modules determines whether or not hold the already established session, it may be configured such that the NAI 57 determines which one of the higher-level modules is currently performing the packet communication, and then determines whether or not to hold the already established session in accordance with the higher-level module.

Further, it may be configured, for example, such that the determination to hold the already established session is always made after the application program having the browser function is started and the packet communication using the PPP session is performed, and that the determination not to hold the already established session is always made after the application program having the game function is started and the packet communication using the PPP session is performed (the above determinations may be made by either each of the higher-level modules or the NAI 57). In such a case, the determination of whether or not to hold the already established session may be made for each of the functions (the mail function and the browser function). Further, the determination of whether or not to hold the already established session may be made in a smaller unit of functions (including a function of the browser function for receiving data from an accessed point within a predetermined range, such as Web sites for mobile phones, and a function of the browser function for receiving data from all over the Internet including Web sites for personal computers as well as the Web sites for mobile phones, i.e., a range not limited to the predetermined range). Furthermore, the determination of whether or not to hold the already established session may be changed according to the situation, even if the function remains the same.

If it is determined at Step S7 that the PPP session should be held, the CPU of the main control unit 31 at Step S8 executes the application program having the browser function, and cuts off a socket session of already established sessions. In this process, the CPU of the main control unit 31 executes the NAI 57 to hold the PPP session already established at the start of the application program having the browser function.

At Step S9, the CPU of the main control unit 31 executes the NAI 57 to set and start a hold timer for holding the already established PPP session for a predetermined time (e.g., three or five minutes) without disconnecting the session.

Then, at Step S10, the CPU of the main control unit 31 executes the NAI 57 to determine whether or not the hold timer has timed out. If the hold timer has timed out, the procedure proceeds to Step S18. If the hold timer has not timed out, the procedure proceeds to Step S11.

At Step S11, the CPU of the main control unit 31 executes the NAI 57 to determine whether or not a connection request has been received from another application program (an higher-level module or a function). If the connection request has not been received from another application program (an higher-level module or a function) at Step S1, the procedure returns to Step S10 to again perform the processes of Step S10 and the subsequent steps.

If another application program (an higher-level module or a function) is started while the CPU of the main control unit 31 is executing the NAI 57 and making the determinations in the processes of Steps S10 and S11, the CPU of the main control unit 31 is assumed to start the module or the function (not illustrated in the flowchart), and to generate a connection request if the operation for the packet communication is performed. For example, if the information "abc@abc.com" is selected by the user during the browsing process, the CPU of the main control unit 31 is assumed to start the mail function, and to generate a connection request if the operation for transmitting a blank mail is performed.

At Step S12, the CPU of the main control unit 31 executes the NAI 57 to stop the hold timer currently counting the time.

At Step S13, the CPU of the main control unit 31 executes the NAI 57 to determine whether or not the new acquired connection request is a PPP session connection request to a different packet gateway PDSN (e.g., the packet gateway PDSN 54) from the packet gateway PDSN of the already established and currently held PPP session (e.g., the packet gateway PDSN 53).

For example, the browser function and the mail function use the same PPP session (the packet gateway PDSN 53). Thus, the new acquired connection request is determined not to be the PPP session connection request to the different packet gateway PDSN 54 from the packet gateway PDSN of the currently held PPP session. Meanwhile, if the user wants to use the packet communication in the game function or the navigation function after the browsing operation using the browser function, for example, there arises a need for the connection to a different gateway. Thus, the new acquired connection request is determined to be the PPP session connection request to the different packet gateway PDSN (e.g., the packet gateway PDSN 54) from the packet gateway PDSN of the currently held PPP session (e.g., the packet gateway PDSN 53).

If it is determined at Step S13 that the new connection request is not the PPP session connection request to the different packet gateway PDSN from the packet gateway PDSN used in the already established and currently held PPP session (e.g., if the connection for the packet communication in the mail function, such as the transmission of a blank mail, is performed after the connection in the browser function, as in the above-described example), the CPU of the main control unit 31 at Step S14 executes the application program (having the mail function), and establishes a socket session.

At Step S15, the CPU of the main control unit 31 executes the NAI 57 to keep holding the PPP session already established by the connection using the PPP, and to perform the connection using the PPP with the use of the PPP session.

Meanwhile, if it is determined at Step S13 that the new connection request is the PPP session connection request to the different packet gateway PDSN from the packet gateway PDSN of the already established and currently held PPP session (e.g., if the connection for the packet communication in the game function, such as the download of a game, is performed after the connection in the browser function), the CPU of the main control unit 31 executes the NAI 57 at Step S16 in a similar manner as in the case in which the disconnection request for disconnecting the PPP session is received from the connected party, to stop holding the PPP session already established at the start of the previous application program, and to disconnect the connection using the PPP via the modulation and demodulation circuit unit 39 and the transmitting and receiving circuit unit 43, which constitute the system layer 58.

At Step S17, the CPU of the main control unit 31 executes the NAI 57 to perform, on the basis of the newly acquired connection request, connection using a different PPP via the modulation and demodulation circuit unit 39 and the transmitting and receiving circuit unit 43, which constitute the system layer 58.

Thus, if a request for establishing a different PPP session from an already established PPP session is received during the holding of the PPP session, it is possible to temporarily disconnect and discard the already established PPP session, and to switch from the previous PPP session to the new PPP session and establish the new PPP session. Accordingly, the application programs do not need to recognize the current connection state, with the recognition process assigned to the NAI 57.

Meanwhile, if it is determined at Step S7 that the disconnection request does not include the hold attribute which indicates that the already established PPP session should not be disconnected but should be held, the CPU of the main control unit 31 executes the NAI 57 at Step S18 to stop holding the already established PPP session, and to disconnect the connection using the PPP.

In the embodiment of the present invention, if the connection request (the connection request for requesting the connection using the PPP) is acquired from an individual application program, the connection using the PPP can be performed on the basis of the acquired connection request.

Further, if the disconnection request for requesting the disconnection of the connection using the PPP is acquired from the individual application program, determination can be made as to whether or not the acquired disconnection request has the hold attribute which indicates that an already established PPP session should not be disconnected but should be held. Then, if the disconnection request is determined to have the hold attribute which indicates that the already established PPP session should not be disconnected but should be held, it is possible not to disconnect but to hold the already established PPP session, while disconnecting a socket session.

Further, the hold timer is set, and if a connection request is acquired from another application program during the counting by the hold timer, determination can be made as to whether or not the new connection request is a PPP session connection request to a different packet gateway PDSN from a packet gateway PDSN of the already established and currently held PPP session. Furthermore, if the new connection request is determined not to be the PPP session connection request to the different packet gateway PDSN from the packet gateway PDSN of the already established and currently held PPP session, it is possible to establish a socket session, and to keep holding the PPP session already established by the connection using the PPP and perform the connection using the PPP with the use of the PPP session.

Accordingly, irrespective of the number of uses of the PPP session between the higher-level modules and the NAI 57 (i.e., the number of the higher-level modules using the PPP session), the PPP sessions between the NAI 57 and the system layer 58 can be unified. Thus, the uses of the PPP session by the individual application programs can be managed in an integrated manner, with the higher-level modules not needing to pay attention to such management as the holding of the PPP session. It is therefore possible to eliminate the waste of disconnecting an already established PPP session and thereafter reestablishing the same PPP session, and thus to reduce the time required for the reestablishment of the PPP session.

Further, if a request for establishing a different PPP session from the already established PPP session is received during the holding of the PPP session, it is possible to temporarily disconnect and discard the already established PPP session, and to switch from the previous PPP session to the new PPP session and establish the new PPP session. Accordingly, the application programs do not need to recognize the current connection state, with the recognition process assigned to the NAI 57.

As a result, the establishment of a session using a predetermined protocol (e.g., a PPP) can be preferably performed. Further, since there is not need to assign a session management function to the application programs, the development efficiency of the application programs and the system can be improved.

In the embodiment of the present invention, the present invention is applied to the establishment of a session using the PPP. However, the application of the present invention is not limited thereto. Thus, for example, the present invention can be applied to the establishment of a session using another protocol, such as PPPoE (Point to Point over Ethernet, which is a registered trademark).

Further, in the connection control process described with reference to the flowchart of FIG. 6, the hold timer is set in the shift of the PPP session between different application programs, and an already established PPP session is held for a preset predetermined time (e.g., three or five minutes). However, the configuration is not limited thereto. Thus, the hold timer may be set, and the already established PPP session may be held for a preset predetermined time (e.g., three or five minutes) irrespective of whether or not another application program is started after the time-out of the hold timer.

With the above configuration, the already established PPP session can be disconnected after the elapse of the preset predetermined time with the use of the hold timer of the NAI 57. Accordingly, the establishment of a session using a predetermined protocol (e.g., the PPP) can be more preferably performed.

The cancellation of the holding of the PPP session after the elapse of the predetermined time can be performed not only by the hold timer but also by the forced disconnection by the respective application programs.

Figure 8:
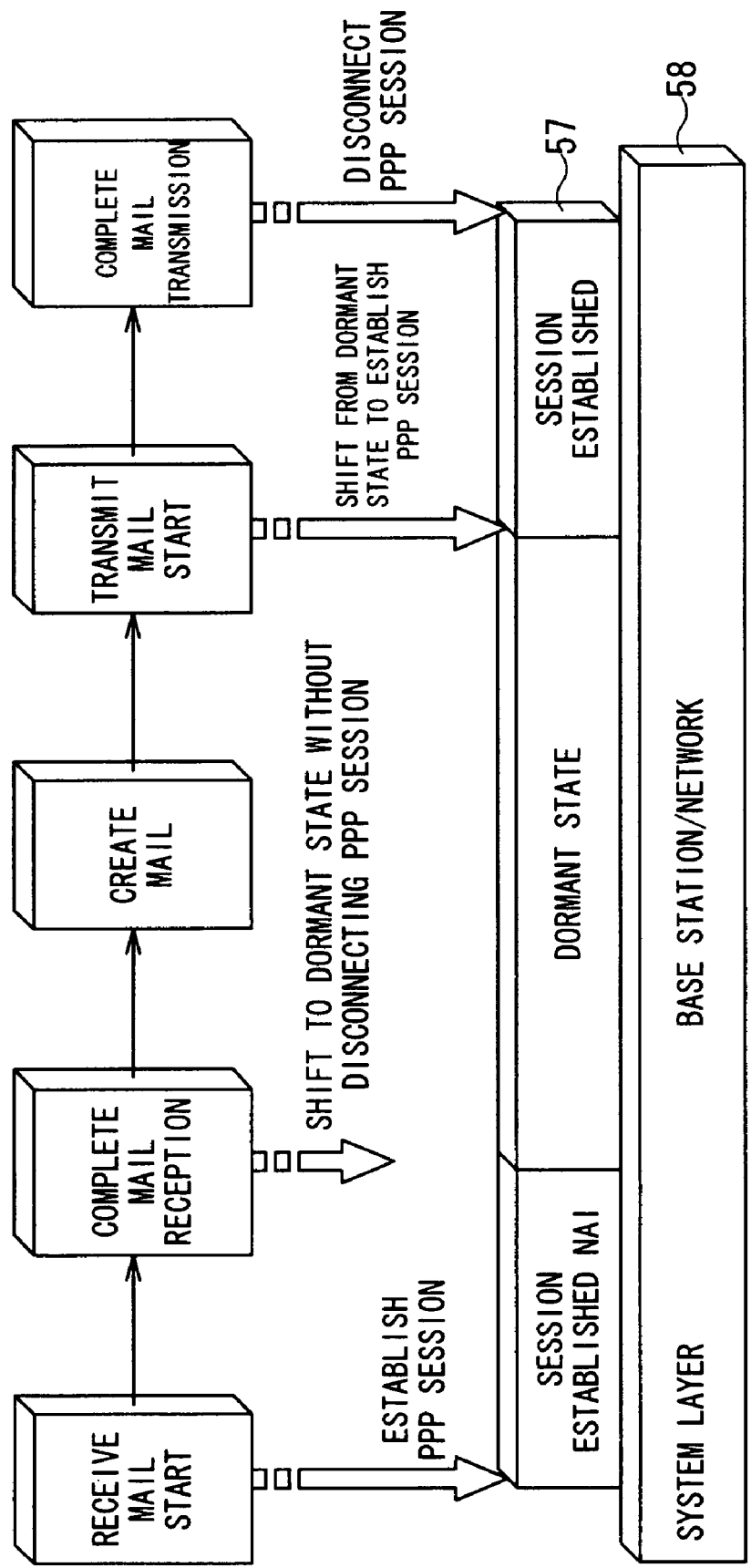
FIG. 8 is an explanatory diagram for explaining a shift to a dormant state and a return from the dormant state during the holding of a session in the configuration for managing, in the integrated manner, the establishment of a PPP session using the NAI according to the embodiment of the present invention.

As illustrated in FIG. 8, for example, in the shift to a dormant state (i.e., a state in which a session is logically established but physically disconnected wirelessly) during the holding of a PPP session, or in the return from the dormant state to the session established state, the respective application programs may be notified of the shift to the dormant state or the return to the session established state. Needless to say, if a new connection request is acquired (received) after the shift to the dormant state during the holding of the PPP session, e.g., in the transmission of a mail after the creation of the mail in the example of FIG. 8, the currently held PPP session is reestablished. A connection control process using the above-described method will be described below. The connection control process is illustrated in a flowchart of FIG. 9.

Figure 6:
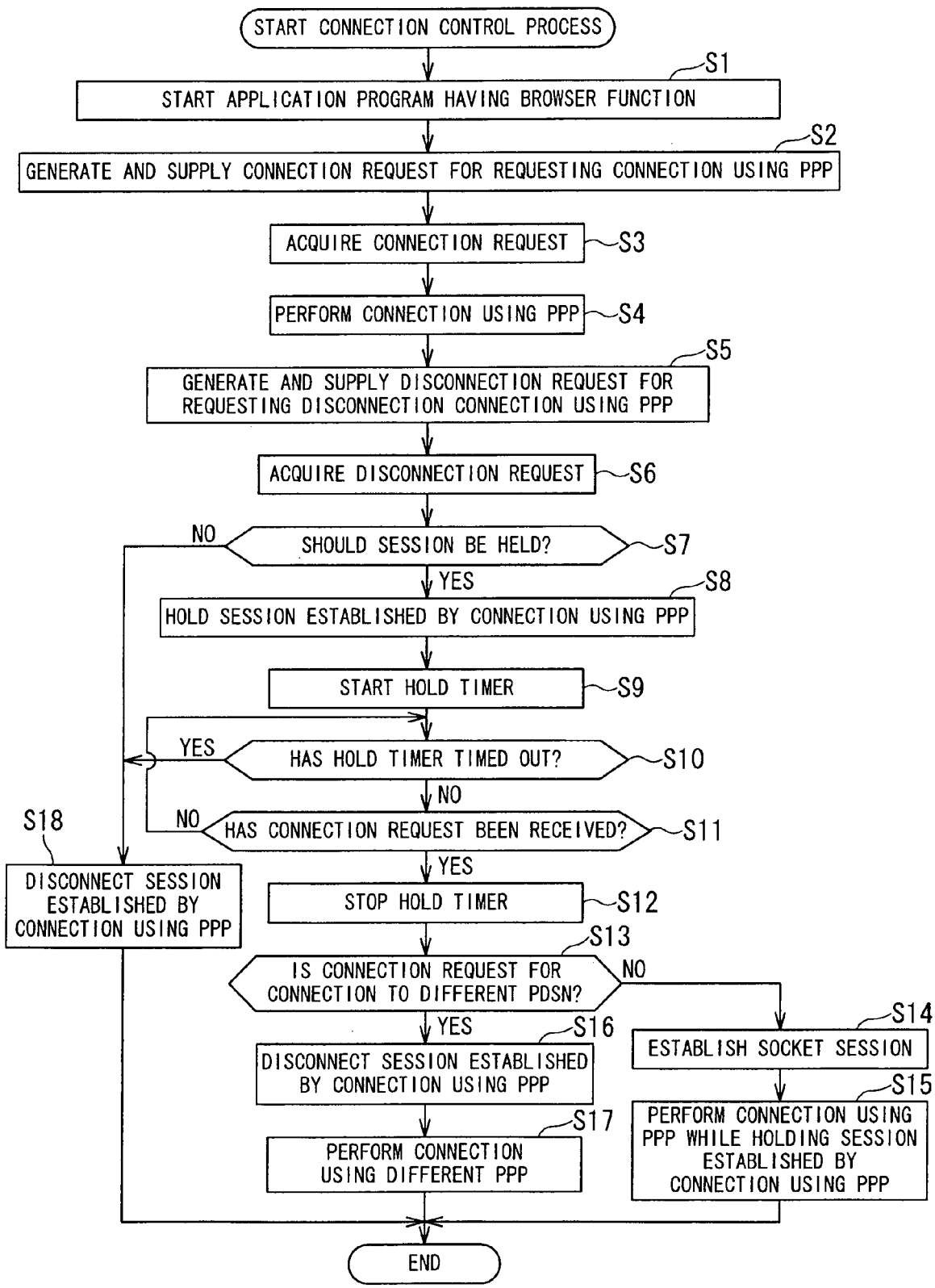
FIG. 6 is a flowchart for explaining a connection control process performed in the mobile phone device of FIG. 3.
Figure 7:
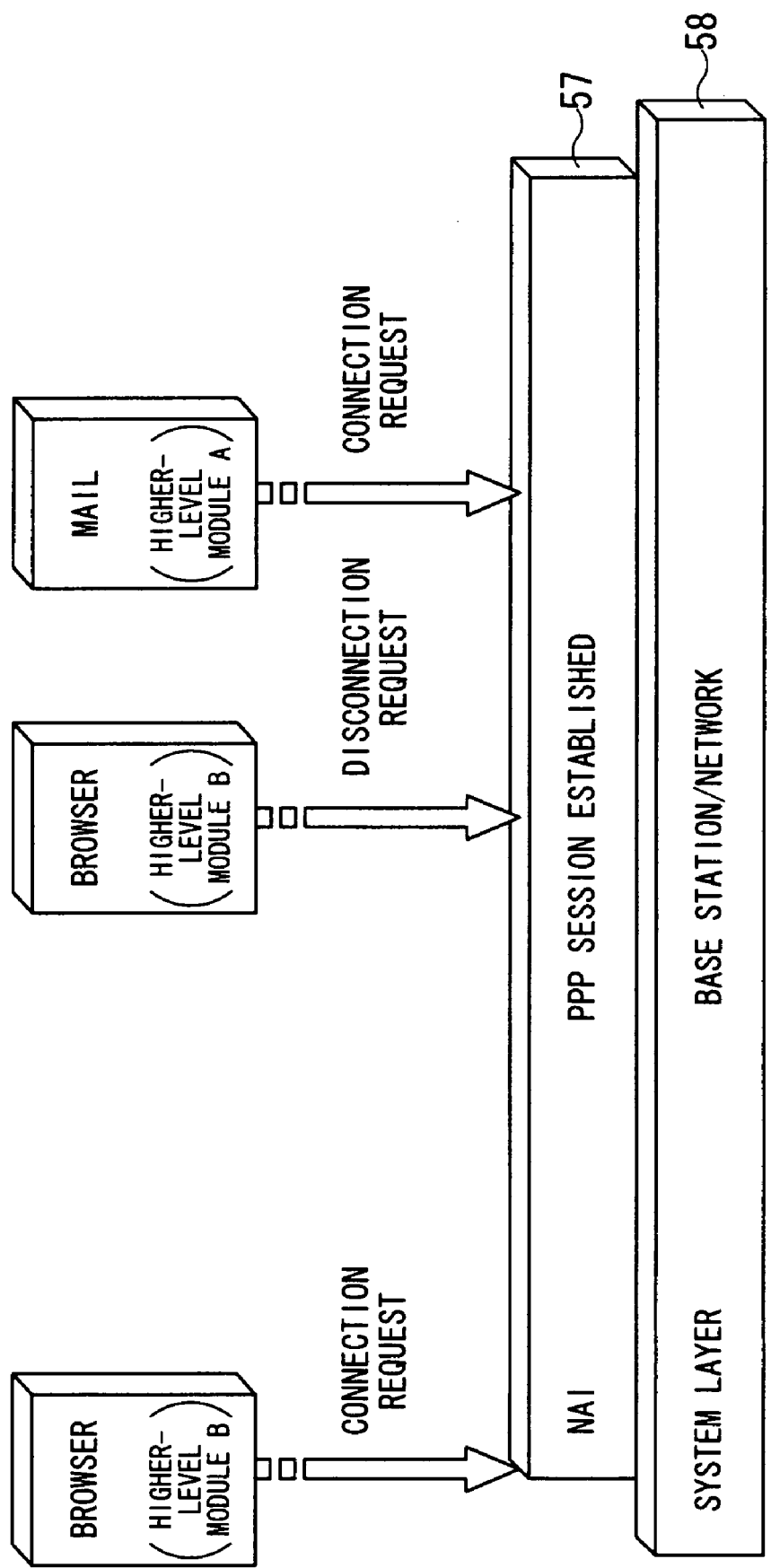
FIG. 7 is a diagram illustrating a specific configuration for managing, in the integrated manner, the establishment of a PPP session using the NAI according to the embodiment of the present invention.
Figure 9:
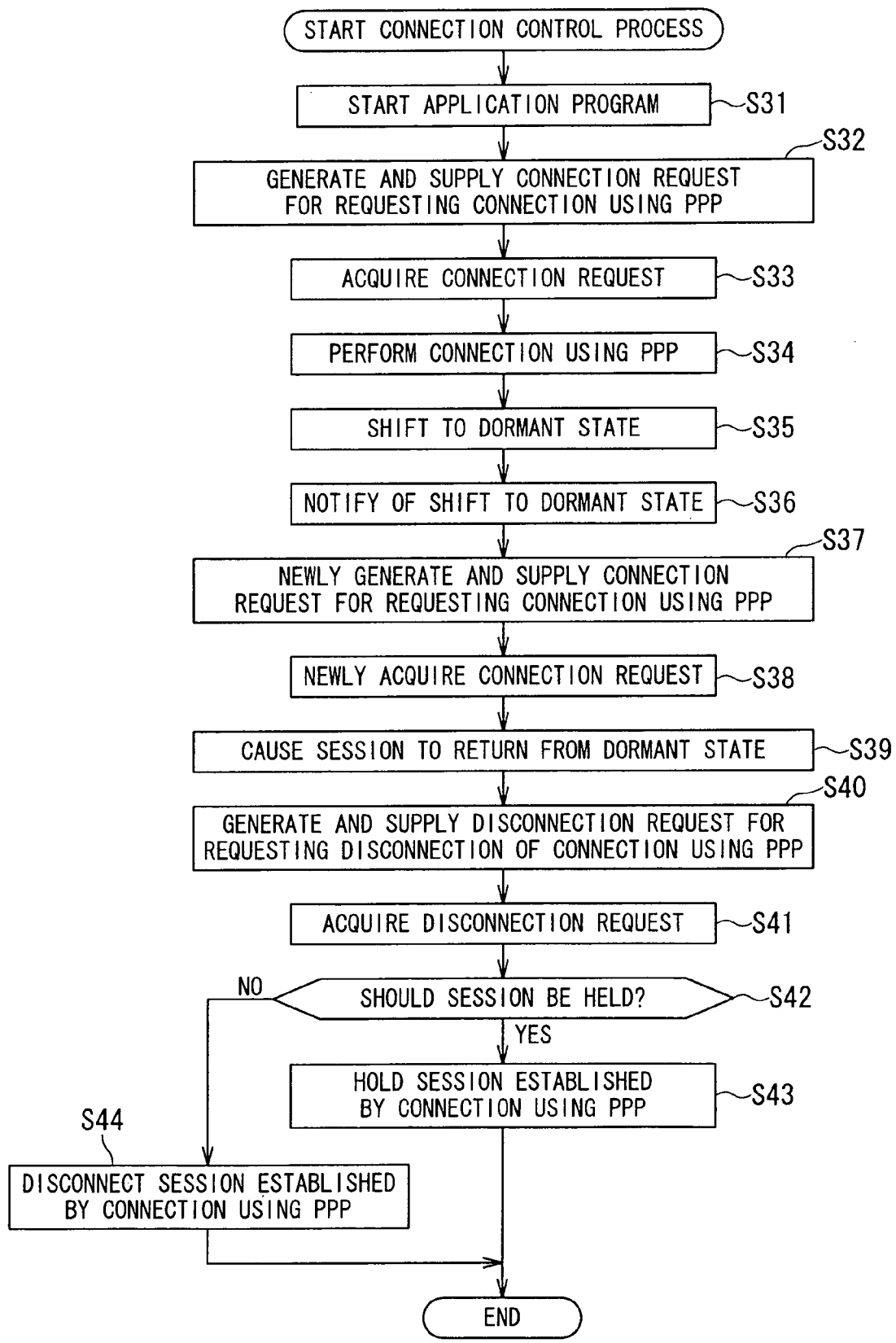
FIG. 9 is a flowchart for explaining another connection control process performed in the mobile phone device of FIG. 3.

The processes of Steps S31 to S34 and Steps S40 to S44 of FIG. 9 are basically similar to the processes of Steps S1 to S4, Steps S5 to S8, and Step S18 of FIG. 6. Thus, description of the processes is redundant and will be omitted.

At Step S35, the CPU of the main control unit 31 executes the NAI 57 to shift the PPP session to the dormant state. At Step S36, the CPU of the main control unit 31 executes the NAI 57 to notify an application program (the application program having the mail function in the example of FIG. 8) of the shift to the dormant state. Accordingly, the application program can recognize that the current connection state is the dormant state.

At Step S37, the CPU of the main control unit 31 executes the application program, newly generates a connection request for requesting the connection using the same PPP, and supplies the new generated connection request to the NAI 57. At Step S38, the CPU of the main control unit 31 executes the NAI 57 to newly acquire the connection request from the application program. Upon acquisition of the new connection request, the CPU of the main control unit 31 executes the NAI 57 at Step S39 to cause the PPP session to return from the dormant state. Thereafter, the procedure proceeds to Step S40.

The hold timer may be operated during the time from the shift to the dormant state at Step S35 to the return from the dormant state at Step S39, and the PPP session may be disconnected if there is no connection using the PPP session within a predetermined time. The above operation of the hold timer can be realized as the operations of Steps S9 to S15 and Step S18 of FIG. 6 are performed in parallel with the operations of Steps S35 to S39. Meanwhile, the return from the dormant state is based on the connection request from the same application program. Thus, the branches in the process of Step S13 are omitted, and the procedure shifts from Step S12 to Step S14.

When the NAI 57 acquires a disconnection request from the network, the acquisition of the disconnection request may be also notified to the respective application programs.

The present invention can be applied not only to the mobile phone device 1 but also to a PDA (Personal Digital Assistant), a personal computer, a mobile game device, a mobile music reproduction device, a mobile moving image reproduction device, and other image processing apparatuses.

Further, the sequences of processes described in the embodiment of the present invention can be performed by either software or hardware.

Further, in the embodiment of the present invention, the description has been made of the example in which the processes of the steps of the flowcharts are performed in chronological order along the order of description. However, the present invention also includes processes which are not necessarily performed in chronological order but performed in parallel or individually.

What is claimed is:

1. An information processing apparatus comprising:
   a processing unit including:
      a connection unit configured to establish a connection with use of a predetermined protocol;
      an acquisition unit configured to acquire a connection request or a disconnection request from respective application programs;
      a control unit configured to control the connection with use of the predetermined protocol performed by the connection unit, based on the connection request or the disconnection request acquired by the acquisition unit; and
      a determination unit configured to determine the presence or absence of a hold attribute included in the disconnection request,
   wherein, the control unit holds a session established by the connection with use of the predetermined protocol performed by the connection unit if the determination unit determines the presence of the hold attribute in the disconnection request.

2. The information processing apparatus according to claim 1, wherein the control unit is configured to control so as to start the connection with use of the predetermined protocol performed by the connection unit, based on the connection request.

3. The information processing apparatus according to claim 1,
   wherein the control unit is configured to control to hold the session established by the connection with use of the predetermined protocol performed by the connection unit, using a hold timer, until the elapse of a preset predetermined time.

4. The information processing apparatus according to claim 1,
   wherein, if the determination unit is configured to determine the absence of the hold attribute in the disconnection request, the control unit is configured to control to disconnect the session established by the connection with use of the predetermined protocol performed by the connection unit.

5. The information processing apparatus according to claim 1, further comprising:
   a determination unit configured to determine, when the acquisition unit is configured to acquire a new connection request from another application program during the holding of a session established by the connection with use of the predetermined protocol performed by the connection unit, whether or not the new connection request is a connection request using different bearer information from bearer information used in an already established session,
   wherein, if the determination unit is configured to determine that the new connection request is a connection request using the same bearer information as the bearer information used in the already established session, the control unit is configured to control to establish a socket session based on the new connection request while holding the session established by the connection with use of the predetermined protocol performed by the connection unit, and to start the connection with use of the predetermined protocol performed by the connection unit.

6. The information processing apparatus according to claim 5,
   wherein, if the determination unit is configured to determine that the new connection request is the connection request using the different bearer information from the bearer information used in the already established session, the control unit is configured to control to disconnect the session established by the connection with use of the predetermined protocol performed by the connection unit, and to thereafter start the connection with use of the predetermined protocol performed by the connection unit, based on the new connection request.

7. The Information processing apparatus according to claim 1, further comprising:
   a notification unit configured to notify the respective application programs of a shift to a predetermined state, when a session established by the connection with use of the predetermined protocol performed by the connection unit has shifted to the predetermined state during the holding of the session.

8. An information processing apparatus comprising:
   a processing unit including:
      a connection unit configured to establish a connection with use of a predetermined protocol;
      an acquisition unit configured to acquire a connection request or a disconnection request from respective application programs; and
      a control unit configured to control the connection with use of the predetermined protocol performed by the connection unit, on the basis of the connection request or the disconnection request acquired by the acquisition unit,
      a determination unit configured to determine, when the acquisition unit is configured to acquire a new connection request from another application program during the holding of a session established by the connection with use of the predetermined protocol performed by the connection unit, whether or not the new connection request is a connection request using different bearer information from bearer information used in an already established session,
   wherein, if the determination unit is configured to determine that the new connection request is a connection request using the same bearer information as the bearer information used in the already established session, the control unit is configured to control to establish a socket session based on the new connection request while holding the session established by the connection with use of the predetermined protocol performed by the connection unit, and to start the connection with use of the predetermined protocol performed by the connection unit.

9. The information processing apparatus according to claim 8, wherein, if the determination unit is configured to determine that the new connection request is the connection request using the different bearer information from the bearer information used in the already established session, the control unit is configured to control to disconnect the session established by the connection with use of the predetermined protocol performed by the connection unit, and to thereafter start the connection with use of the predetermined protocol performed by the connection unit, based on the new connection request.

* * * * *